(12) United States Patent
Kuchiki (10) Patent No.: US 12,401,910 B2
(45) Date of Patent: Aug. 26, 2025

(54) IMAGE PROCESSING APPARATUS, IMAGE PROCESSING METHOD, AND IMAGE CAPTURE APPARATUS

(71) Applicant: CANON KABUSHIKI KAISHA, Tokyo (JP)

(72) Inventor: Hiroaki Kuchiki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 18/500,141

(22) Filed: Nov. 2, 2023

(65) Prior Publication Data

US 2024/0163567 A1    May 16, 2024

(30) Foreign Application Priority Data

Nov. 11, 2022    (JP) ................ 2022-181245

(51) Int. Cl.
*H04N 23/741*    (2023.01)
*H04N 23/63*    (2023.01)
*H04N 23/71*    (2023.01)

(52) U.S. Cl.
CPC ......... *H04N 23/741* (2023.01); *H04N 23/635* (2023.01); *H04N 23/71* (2023.01)

(58) Field of Classification Search
CPC .... H04N 23/741; H04N 23/635; H04N 23/71; H04N 23/743; H04N 5/57; H04N 25/57
USPC ........................................... 348/222.1
See application file for complete search history.

(56) References Cited

U.S. PATENT DOCUMENTS

| | | | |
|---|---|---|---|
| 11,196,938 B2 | 12/2021 | Matsuoka | |
| 2017/0287121 A1* | 10/2017 | Nagashima | .............. H04N 5/77 |
| 2020/0344400 A1* | 10/2020 | Matsuoka | .............. H04N 23/84 |

FOREIGN PATENT DOCUMENTS

JP    2020-182179 A    11/2020

* cited by examiner

*Primary Examiner* — Yogesh K Aggarwal
(74) *Attorney, Agent, or Firm* — Venable LLP (57) ABSTRACT

An image processing apparatus acquires image data and first information relating to a maximum luminance value of an output dynamic range of the image data. The apparatus then applies, to the image data, processing in which a luminance value of the image data and a first value based on the first information are used. In a case in which the image data is encoded in a first numerical range and the first information is encoded in a second numerical range that is different from the first numerical range, the apparatus applies the processing to the image data after converting the image data, the first information, or the first value so that the image data and the first value have values if the image data and the first value would have been encoded in a same numerical range.

18 Claims, 9 Drawing Sheets

| FOR VIDEO RANGE | |
|---|---|
| maxDRL | HIGHLIGHT WARNING THRESHOLD |
| 64 | — |
| : | : |
| 509 | 505 |
| : | : |
| 636 | 632 |
| 674 | 669 |
| 701 | 697 |
| 722 | 718 |
| : | : |
| 940 | 936 |

FIG. 7C

| FOR FULL RANGE | |
|---|---|
| maxDRL | HIGHLIGHT WARNING THRESHOLD |
| 0 | — |
| : | : |
| 520 | 515 |
| : | : |
| 668 | 663 |
| 712 | 707 |
| 744 | 739 |
| 769 | 764 |
| : | : |
| 1023 | 1018 |

IMAGE PROCESSING APPARATUS, IMAGE PROCESSING METHOD, AND IMAGE CAPTURE APPARATUS

BACKGROUND OF THE INVENTION

Field of the Invention

The present invention relates to an image processing apparatus, an image processing method, and an image capture apparatus.

Description of the Related Art

The luminance corresponding to a value in image data may differ depending on the tone characteristic and encoding method applied to the image data. A tone characteristic is a correspondence between an input luminance range and an output luminance range, such as the so-called gamma curve or electro-optical transfer function (EOTF). Furthermore, an encoding method is a method used to allocate the output luminance range to a specific numerical range. For example, in a case in which the output luminance range is to be represented using 10-bit numerical values, there is known a method in which the output luminance range is represented using the range of 0-1023 (the "full" range) and a method in which the output luminance range is represented using the range of 64-940 (the "video" or "limited" range). Furthermore, a range conversion technique for mutually converting these ranges is also known.

Thus, in a case in which luminance-based processing is applied to input image data, for example, it may be impossible to obtain an appropriate processing result unless the tone characteristic and encoding method applied to the image data (esp. the encoding method) are taken into consideration. For example, in highlight warning display processing as disclosed in Japanese Patent Laid-Open No. 2020-182179, a warning may be displayed in an incorrect area.

SUMMARY OF THE INVENTION

In one aspect thereof, the present invention provides an image processing apparatus and an image processing method that can process luminance of image data appropriately in accordance with the encoding method applied to the image data.

According to an aspect of the present invention, there is provided an image processing apparatus comprising: one or more processors that execute a program stored in a memory and thereby function as: an acquiring unit configured to acquire image data and first information relating to a maximum luminance value of an output dynamic range of the image data; and a processing unit configured to apply, to the image data, processing in which a luminance value of the image data and a first value based on the first information are used, wherein, in a case in which the image data is encoded in a first numerical range and the first information is encoded in a second numerical range that is different from the first numerical range, the processing unit applies the processing to the image data after converting the image data, the first information, or the first value so that the image data and the first value have values if the image data and the first value would have been encoded in a same numerical range.

According to an aspect of the present invention, there is provided an image capture apparatus comprising: an image sensor; and an image processing apparatus that uses image data obtained using the image sensor, wherein the image processing apparatus comprising: one or more processors that execute a program stored in a memory and thereby function as: an acquiring unit configured to acquire image data and first information relating to a maximum luminance value of an output dynamic range of the image data; and a processing unit configured to apply, to the image data, processing in which a luminance value of the image data and a first value based on the first information are used, wherein, in a case in which the image data is encoded in a first numerical range and the first information is encoded in a second numerical range that is different from the first numerical range, the processing unit applies the processing to the image data after converting the image data, the first information, or the first value so that the image data and the first value have values if the image data and the first value would have been encoded in a same numerical range.

According to an aspect of the present invention, there is provided an image processing method to be executed by an image processing apparatus, the image processing method comprising: acquiring image data and first information relating to a maximum luminance value of an output dynamic range of the image data; and applying, to the image data, processing in which a luminance value of the image data and a first value based on the first information are used, wherein, in a case in which the image data is encoded in a first numerical range and the first information is encoded in a second numerical range that is different from the first numerical range, the applying of the processing includes: converting the image data, the first information, or the first value so that the image data and the first value have values if the image data and the first value would have been encoded in a same numerical range; and after the converting, applying the processing to the image data.

According to an aspect of the present invention, there is provided a non-transitory computer-readable medium that stores therein a program including instructions that can be executed by a computer, the instructions, when executed by the computer, causing the computer to execute an image processing method comprising: acquiring image data and first information relating to a maximum luminance value of an output dynamic range of the image data; and applying, to the image data, processing in which a luminance value of the image data and a first value based on the first information are used, wherein, in a case in which the image data is encoded in a first numerical range and the first information is encoded in a second numerical range that is different from the first numerical range, the applying of the processing includes: converting the image data, the first information, or the first value so that the image data and the first value have values if the image data and the first value would have been encoded in a same numerical range; and after the converting, applying the processing to the image data.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that, in the following embodiments, a case in which the present invention is implemented in a digital camera will be described. However, the image capture function is not always necessary in the present invention, and the present invention can be implemented in any electronic device capable of processing image data. For example, such electronic devices include computer devices (personal computers, tablet computers, media players, PDAs, etc.), smartphones, game machines, robots, drones, and drive recorders, but there is no limitation to such devices.

First Embodiment

Figure 1:
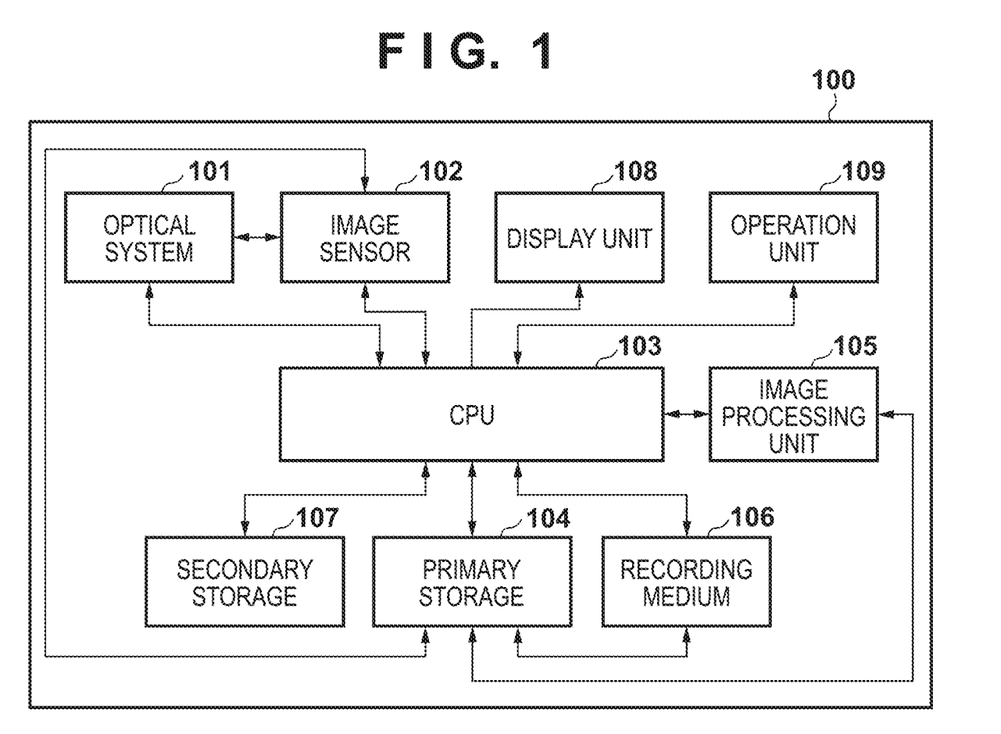
FIG. 1 is a block diagram illustrating an example of a basic functional configuration of an image capture apparatus that is an image processing apparatus according to embodiments of the present invention.

FIG. 1 is a block diagram illustrating an example of a basic functional configuration of a digital camera 100 (hereinafter "camera 100") that is one example of an image processing apparatus according to embodiments of the present invention. An optical system 101 is an image capture optical system that includes a lens group, a shutter, an aperture, etc., and forms an optical image of a subject on an imaging surface of an image sensor 102. The lens group includes fixed lenses and movable lenses, and the movable lenses include an image stabilization lens, a focus lens, a variable magnification lens, and the like. Furthermore, the aperture may have a mechanical shutter function. The operations of the movable lenses, the aperture, and the shutter are controlled by a CPU 103, which is a main control unit of the camera 100. The optical system 101 may be may be interchangeable or non-interchangeable.

The image sensor 102 is a CMOS image sensor, for example, and a plurality of pixels each including a photoelectric conversion region are arranged two-dimensionally in the image sensor 102. Furthermore, the image sensor 102 includes color filters having a specific color pattern, and each pixel is provided with a filter of one color that is in accordance with the color pattern. The present invention is not dependent on the color pattern of the color filters; however, here, it is assumed that color filters of a primary-color Bayer array are provided. Accordingly, each pixel is provided with a red (R) color filter, a green (G) color filter, or a blue (B) color filter. The image sensor 102 converts the optical image into an analog image signal indicating luminance information of the individual pixels by photoelectrically converting the optical image using the pixels. The analog image signal generated by the image sensor 102 is converted into a digital image signal by an A/D converter (unillustrated). Note that the A/D converter may be included in the image sensor 102, or otherwise the CPU 103 may perform the A/D conversion. Each pixel signal constituting the digital image signal output by the A/D converter is RAW data including only a luminance component of the color of the color filter provided to the pixel having generated the signal. The CPU 103 stores RAW data in a primary storage 104. Note that the shooting sensitivity (hereinafter "ISO speed") of the image sensor 102 is set by the CPU 103.

The CPU 103 controls the units of the camera 100 and realizes various functions of the camera 100 by transferring one or more programs stored in a secondary storage 107 to the primary storage 104 and executing the programs. Note that, in the following description, at least some of the functions that the CPU 103 realizes by executing programs may be realized by dedicated hardware such as an ASIC.

For example, the primary storage 104 is a volatile storage device such as a RAM. In addition to being used by the CPU 103 to execute programs, the primary storage 104 is also used as a buffer memory for image data, a work area for image processing, a video memory for display, and the like.

For example, the secondary storage 107 is a rewritable nonvolatile storage device such as an EEPROM. Programs (instructions) that can be executed by the CPU 103, settings of the camera 100, GUI data, and the like are stored in the secondary storage 107.

For example, a recording medium 106 is a rewritable nonvolatile storage device such as a semiconductor memory card. The recording medium 106 may or may not be detachable from the camera 100. Data (still image data, moving image data, audio data, etc.) generated by the camera 100 can be recorded in the recording medium 106. That is, the camera 100 includes the function of reading from and writing to the recording medium 106, and a detachment mechanism (in a case in which the recording medium 106 is detachable). Note that the recording destination of data generated by the camera 100 is not limited to the recording medium 106. Data generated by the camera 100 may be transmitted to an external device via a communication interface included in the camera 100 and be recorded in a recording device that the external device is capable of accessing.

For example, a display unit 108 is a liquid-crystal display. The CPU 103 functions as a display control device of the display unit 108. During a shooting standby state and while a moving image is being recorded, the display unit 108 functions as an electronic viewfinder by a moving image that is shot being displayed on the display unit 108 in real time. Furthermore, image data recorded in the recording medium 106 and GUI images such as a menu screen are also displayed on the display unit 108.

An operation unit 109 is a generic name referring to a group of input devices for accepting user operations. For example, one or more buttons and levers, a touch panel, and the like are used in the operation unit 109. The operation unit 109 may include input devices, such as those operated by voice or line of sight, that do not need to be operated physically. Each of the input devices included in the operation unit 109 is given a name corresponding to the function allocated thereto. Representative examples include a release button, a menu button, a directional key, an enter (set) button, a mode-switching dial, and the like. Note that different functions may be selectively allocated to one input device.

An image processing unit 105 applies predetermined image processing to image data (may be RAW data or developed image data) to generate image data of different formats, and acquire and/or generate various types of information. For example, the image processing unit 105 may be a dedicated hardware circuit, such as an ASIC, that is designed to realize a specific function, or may be configured such that a specific function is realized by a programmable processor, such as a DSP, executing software.

For example, the image processing applied by the image processing unit 105 may include pre-processing, color interpolation processing, correction processing, detection processing, data processing, evaluation-value calculation processing, special-effects processing, and the like.

The pre-processing may include signal amplification, reference-level adjustment, defective-pixel correction, and the like.

The color interpolation processing is performed in a case in which an image sensor is provided with color filters, and is processing for interpolating values of color components that are not included in the individual pieces of pixel data constituting the image data. The color interpolation processing is also referred to as demosaicing processing.

The correction processing may include processing such as white-balance adjustment, tone correction, the correction of image degradation caused by the optical aberration of the image capture optical system 101 (image recovery), the correction of the effect of vignetting of the image capture optical system 101, and color correction.

The detection processing may include the detection of characteristic regions (e.g., face regions and human-body regions) and the movement thereof, person recognition processing, and the like.

The data processing may include processing such as the cutting out of regions (trimming), compositing, scaling, encoding/decoding, and the generation of header information (generation of a data file). The generation of display image data and recording image data is also included in the data processing.

The evaluation-value calculation processing may include processing such as the generation of signals and an evaluation value to be used for automatic focus detection (AF), and the generation of an evaluation value to be used for automatic exposure control (AE).

The special-effects processing may include processing such as the addition of blur, the changing of color tone, and relighting.

Note that these are examples of processing that can be applied by the image processing unit 105, and do not limit the processing applied by the image processing unit 105.

In the present embodiment, highlight warning processing will be described as one example of luminance-based processing applied to image data (moving image data). However, other processing can be similarly applied.

Furthermore, in the present embodiment, the highlight warning processing is applied using the "maximum Dynamic Range Level" ("maxDRL") parameter. While described in detail later, maxDRL is the maximum luminance value [nits] of an output dynamic range or a tone value (signal level) corresponding to the maximum luminance value. Note that 1 nit equals 1 cd/m².

Figure 2:
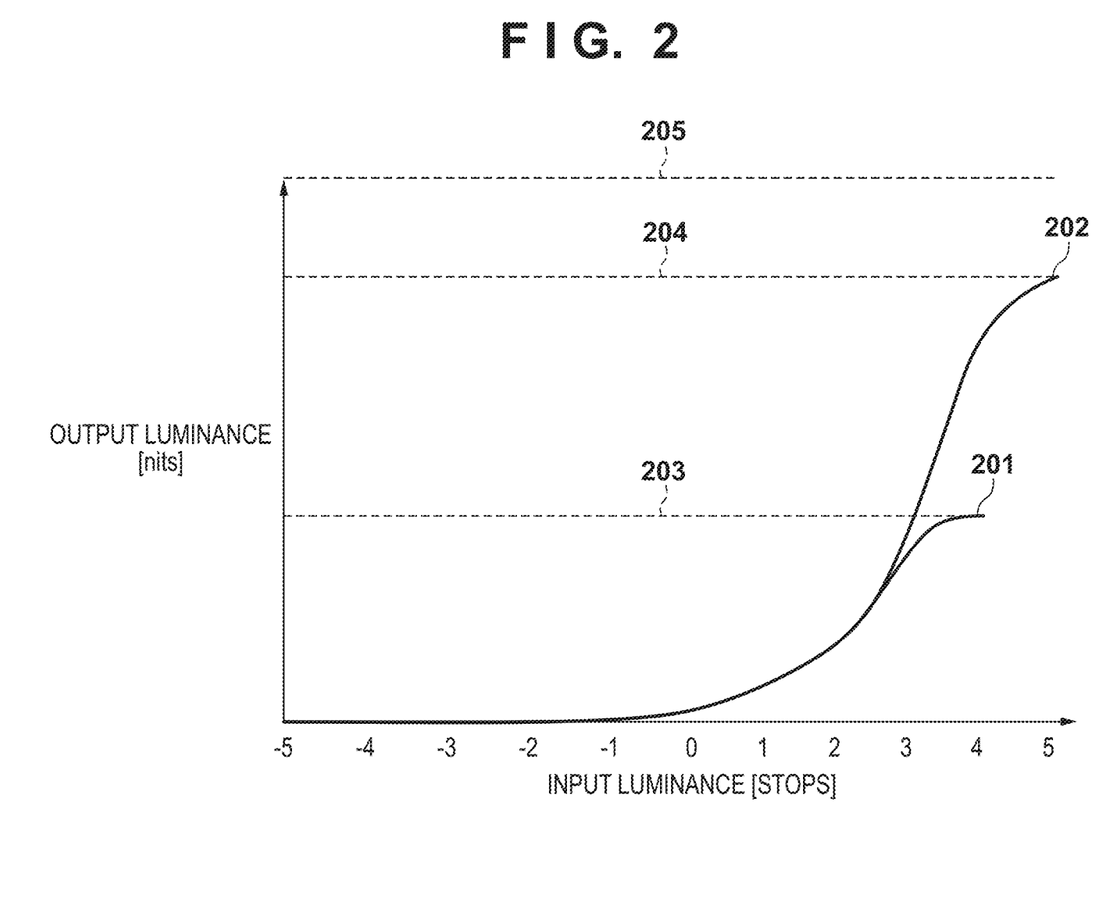
FIG. 2 is a diagram illustrating examples of tone characteristics applied to image data.

A plurality of tone characteristics 201 and 202 having different output dynamic ranges as illustrated in FIG. 2 are provided in advance in the camera 100. A tone characteristic is also referred to as a gamma curve, electro-optical transfer function (EOTF), or the like, and indicates the relationship between input tone values (signal levels) and output luminance. For example, the camera 100 stores, in the secondary storage 107, a plurality of tone characteristics associated with shooting modes. For example, the tone characteristic 201 having a maximum luminance value 203 is associated with a first shooting mode, and the tone characteristic 202 having a maximum luminance value 204 is associated with a second shooting mode.

Note that there are tone characteristics in which output luminance is processed as relative values and tone characteristics in which output luminance is processed as absolute values. In the case of a tone characteristic in which output luminance is processed as relative values, the maximum luminance value would be the maximum luminance value of the display device. Thus, the brightness of an image may differ depending on the display device. On the other hand, in the case of a tone characteristic in which output luminance is processed as absolute values, the maximum luminance value is independent of the maximum luminance value of the display device. Thus, the brightness of an image remains the same regardless of the display device within a displayable luminance range.

For example, in an international standard for HDR images (ITU-R BT.2100), HLG is defined as a tone characteristic in which output luminance is processed as relative values, and PQ is defined as a tone characteristic in which output luminance is processed as absolute values. In PQ, the maximum luminance is set as 10000 [nits]. For example, if the tone characteristics 201 and 202 illustrated in FIG. 2 conform to PQ, luminance 205 corresponds to 10000 [nits]. On the other hand, the tone characteristics 201 and 202 exhibit different maximum luminance values (peak luminance). Because the tone characteristics 201 and 202 are associated with shooting modes or the like as described above, images that are shot would have different output dynamic ranges depending on the shooting mode. Accordingly, as information indicating the output dynamic range used to shoot an image, the maximum luminance value [nits] of the output dynamic range or a tone value (signal level) corresponding to the maximum luminance value is recorded as metadata. This is referred to as maxDRL in the present embodiment. In the present embodiment, image data (moving image data) for which a tone characteristic in which output luminance is processed as absolute values has been used is processed. However, similar processing can also be applied to image data (moving image data) for which a tone characteristic in which output luminance is processed as relative values has been used. Furthermore, image data (moving image data) may be an HDR image or an SDR image.

In a case in which maxDRL is a tone value corresponding to the maximum luminance value, maxDRL is prepared for each encoding method or identification information of the encoding method is associated with maxDRL because the numerical range of tone values differs depending on the encoding method. Here, the encoding method is either the full range or the video range (limited range). The numerical range of image data also differs between a case in which image data is encoded using the full range and a case in which image data is encoded using the video range.

In the present embodiment, the camera 100 can acquire maxDRL of the image data (moving image data) to be processed. For example, in a case in which recorded moving image data is to be processed, the camera 100 can acquire maxDRL recorded in association with the moving image data. Furthermore, for moving image data shot by the camera 100, maxDRL stored in advance in the secondary storage 107 in accordance with the shooting mode can be used, for example.

In the following, the highlight warning processing in the embodiment will be described. The highlight warning processing is processing for presenting blown-out highlight regions in images. For example, the highlight warning processing may be processing for superimposing and displaying an image of a specific color or a zebra pattern on blown-out highlight regions; however, blown-out highlight regions may be presented using other methods. For example, the highlight warning processing is executed in a case in which the user has enabled highlight warning. The highlight warning processing may be applied to still images or moving images; however, generally, the highlight warning processing is usually applied to moving images, particularly a moving image to be used for live-view display.

A blown-out highlight region in an image can be detected as a region whose luminance is higher than or equal to a threshold. In the present embodiment, with respect to an image to which a tone characteristic in which output luminance is processed as absolute values has been applied, appropriate detection of blown-out highlight regions is realized regardless of the encoding method by applying a threshold that is in accordance with the encoding method.

Example 1

Figure 3:
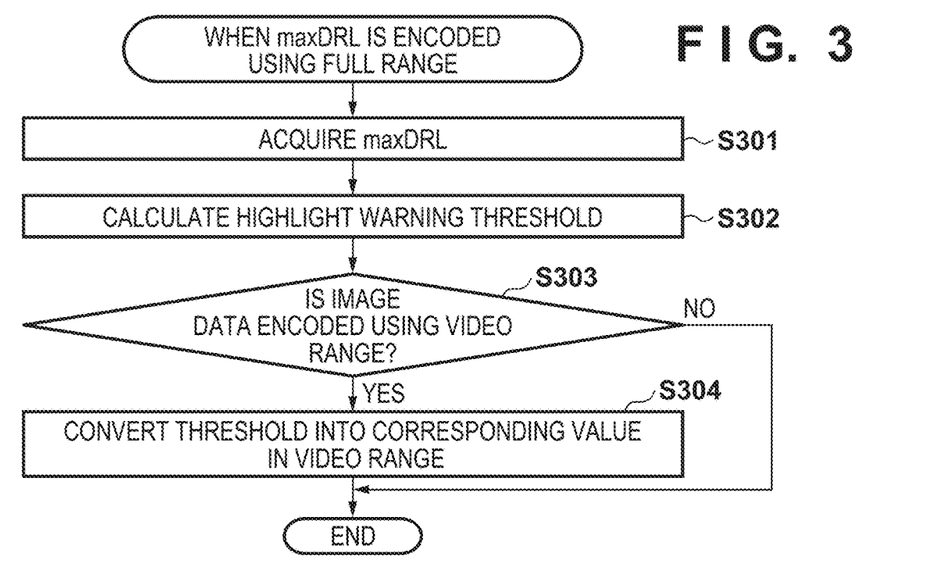
FIG. 3 is a flowchart relating to an example of threshold calculation processing in a first embodiment.

FIG. 3 is a flowchart relating to highlight-warning-threshold calculation processing in a case in which maxDRL is encoded using the full range (encoded in a second numerical range). Here, the highlight warning processing is executed when moving image data recorded in the recording medium 106 is played back.

In step S301, the CPU 103 acquires maxDRL corresponding to the moving image data to be played back. Here, maxDRL is acquired from metadata of a moving image data file recorded in the recording medium 106.

In step S302, the CPU 103 calculates a highlight warning threshold using maxDRL. For example, in a case in which highlight warning is to be performed for regions whose luminance is higher than or equal to 90% of maxDRL, the CPU 103 can calculate the threshold by multiplying maxDRL by a factor of 0.9. Note that the factor may be change in accordance with a setting made by the user. Furthermore, the threshold may be calculated using other methods, such as calculating the value of the difference between maxDRL and an arbitrarily defined constant.

In step S303, the CPU 103 determines whether or not the moving image data to be played back is encoded using the video range (encoded in a first numerical range). For example, the CPU 103 can acquire the encoding method of the moving image data from the metadata of the moving image data file.

In a case in which it is determined that the moving image data is not encoded using the video range (is encoded using the full range), the CPU 103 terminates the threshold calculation processing without changing the threshold calculated in step S302. This is because the encoding method of the moving image data and the encoding method of maxDRL are the same.

On the other hand, in a case in which it is determined that the moving image data is encoded using the video range, the CPU 103 executes step S304. In step S304, the CPU 103 converts the threshold calculated in step S302 into a corresponding threshold in the video range. Specifically, the CPU 103 converts the threshold so that highlight warning is performed in the same regions as those in a case in which the threshold based on maxDRL encoded using the full range is applied to moving image data encoded using the full range.

Suppose that a threshold encoded using the video range is Th_v, and a threshold encoded using the full range is Th_f. In a case in which tone values are 10-bit values, the CPU 103 can convert the thresholds using the following formula 1.

$$Th\_v = Th\_f \times (940-64)/1023 + 64 \qquad \text{Formula 1}$$

Note that digits after the decimal point can be rounded using any method. Having converted the threshold, the CPU 103 terminates the threshold calculation processing.

Together with the threshold calculated as described above, the CPU 103 provides the image processing unit 105 with an instruction to enable the application of the highlight warning processing. The image processing unit 105 generates display moving image data from the moving image data read from the recording medium 106. Then, the image processing unit 105 applies the threshold to the luminance values of the individual pieces of pixel data constituting one frame of the display moving image data, and detects pieces of pixel data having luminance values higher than or equal to the threshold. Furthermore, the image processing unit 105 applies processing so that highlight warning display is performed for pixels having luminance values higher than or equal to the threshold. For example, the image processing unit 105 can execute the highlight warning display by changing the display color of pixels having luminance values higher than or equal to the threshold to a specific color, or by superimposing and displaying a predetermined pattern image or the like.

Note that, in a case in which maxDRL is encoded using the video range and the moving image data is encoded using the full range, the CPU 103 converts thresholds using formula 1' below in step S304.

$$Th\_f = (Th\_v - 64) \times 1023/(940-64) \qquad \text{Formula 1'}$$

Figure 7A:
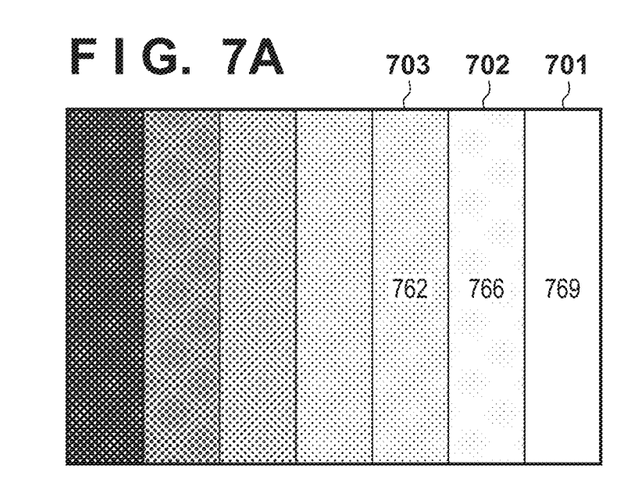
FIGS. 7A to 7D are diagrams for describing highlight warning display in the first embodiment.
Figure 7B:
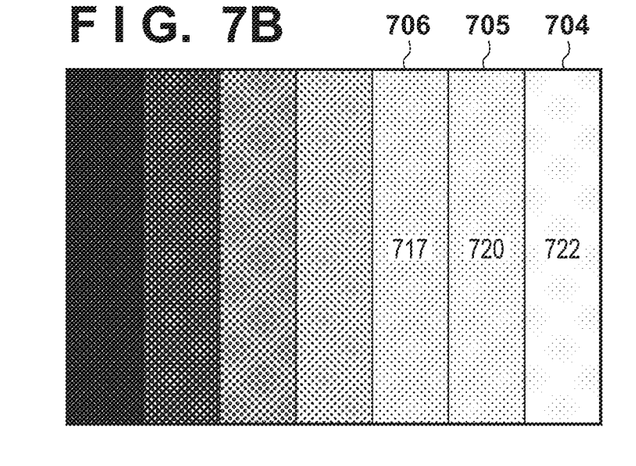

The effect achieved by the threshold calculated through the processing in FIG. 3 will be described with reference to FIGS. 7A and 7B. FIG. 7A is a frame image represented by moving image data encoded using the full range, and the tone values of regions 701, 702, and 703 are 769, 766, and 762, respectively. FIG. 7B is a frame image obtained by changing the encoding method of the image in FIG. 7A to the video range. Regions 704 to 706 correspond to the regions 701 to 703, and the tone values of the regions 704, 705, and 706 are 722, 720, and 717, respectively.

For example, suppose that maxDRL is encoded using the full range, and the maxDRL value is 769. Furthermore, suppose that the highlight warning threshold is 764, which is obtained by subtracting 5 from maxDRL. When this threshold is applied to the image in FIG. 7A, highlight warning display is performed in the regions 701 and 702, excluding the region 703. When the same threshold is applied to the image in FIG. 7B, there would be no region in which highlight warning display is performed because all regions have tone values lower than the threshold.

When the highlight warning threshold is converted into a threshold for the video range using formula 1, the threshold after conversion would be 718. When this threshold after conversion is applied to the image in FIG. 7B, highlight warning display is performed in the regions 704 and 705, excluding the region 706. In such a manner, in a case in which moving image data and maxDRL are encoded in different numerical ranges, the moving image data or a threshold based on maxDRL is converted so that the moving image data and the threshold have values encoded in the same numerical range. Thus, appropriate highlight warning display can be realized regardless of numerical ranges into which encoding is performed.

Example 2

Figure 4:
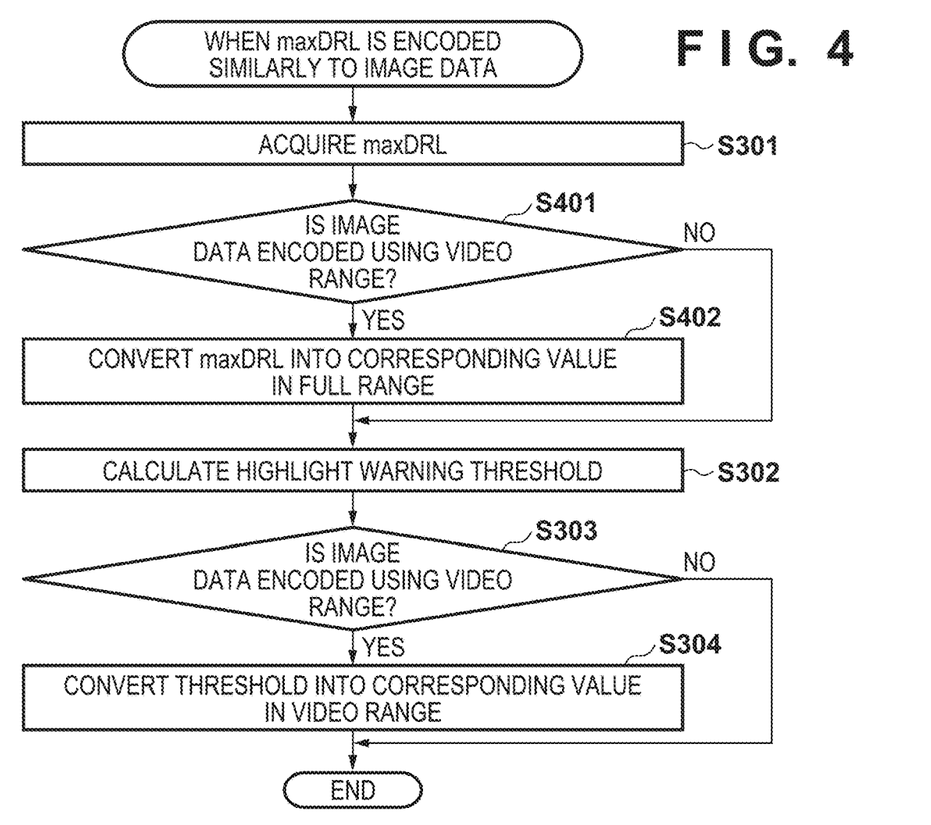
FIG. 4 is a flowchart relating to another example of the threshold calculation processing in the first embodiment.

FIG. 4 is a flowchart relating to highlight-warning-threshold calculation processing in a case in which maxDRL is recorded in a state in which maxDRL is encoded in the same numerical range as moving image data. Note that steps that are the same as those described in FIG. 3 are given the same reference numerals as those in FIG. 3.

In step S301, the CPU 103 acquires maxDRL corresponding to the moving image data to be played back. Here, maxDRL is acquired from metadata of a moving image data file recorded in the recording medium 106.

In step S401, the CPU 103 determines whether or not the moving image data to be played back is encoded using the video range. For example, the CPU 103 can acquire the encoding method of the moving image data from the metadata of the moving image data file.

Suppose that, in the threshold calculation in step S302, it is assumed that maxDRL is encoded using the full range. Thus, in a case in which it is determined that the moving image data is encoded using the video range in step S401, the CPU 103 executes step S402. Furthermore, in a case in which it is determined that the moving image data is not encoded using the video range (that the moving image data is encoded using the full range), the CPU 103 skips step S402 and executes step S302.

In step S402, the CPU 103 converts maxDRL acquired in step S301 into a corresponding value in the full range.

Suppose that maxDRL encoded using the video range is maxDRL_v, and maxDRL encoded using the full range is maxDRL_f. In a case in which tone values are 10-bit values, the CPU 103 can convert maxDRL using the following formula 2.

$$\text{maxDRL}\_f = (\text{maxDRL}\_v - 64) \times 1023/(940-64) \quad \text{Formula 2}$$

Note that digits after the decimal point can be rounded using any method. Having converted maxDRL, the CPU 103 executes step S302.

In step S302, the CPU 103 calculates a highlight warning threshold to be applied to moving image data whose encoding method is the full range as described above. Description of the processing in and after step S303 is omitted because the processing is as described with reference to FIG. 3.

In such a manner, appropriate highlight warning display can be realized also in a case in which the processing by the camera 100 for calculating a threshold from maxDRL is based on maxDRL encoded using the full range, and maxDRL of moving image data is encoded using the same method as that used for the moving image data.

Note that a case in which the processing by the camera 100 for calculating a threshold from maxDRL is based on maxDRL encoded using video range can also be handled using a similar method. Specifically, in a case in which it is determined in step S401 that moving image data is encoded using the full range, the CPU 103 converts maxDRL into a corresponding value in the video range using the following formula 2' in step S402.

$$\text{maxDRL}\_v = \text{maxDRL}\_f \times (940-64)/1023 + 64 \quad \text{Formula 2'}$$

In a case in which it is subsequently determined in step S303 that the moving image data is encoded using the full range, the CPU 103 converts the threshold calculated in step S302 into a corresponding value in the full range using above-mentioned formula 1' in step S304.

Example 3

Figure 5:
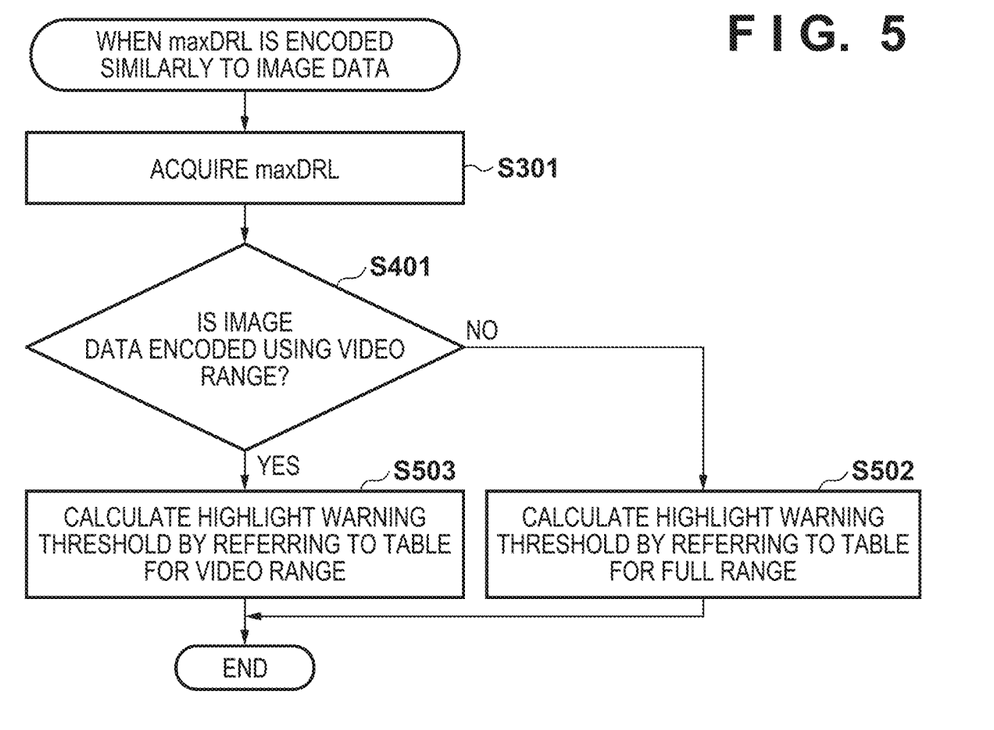
FIG. 5 is a flowchart relating to yet another example of the threshold calculation processing in the first embodiment.

FIG. 5 is a flowchart relating to highlight-warning-threshold calculation processing in which a highlight warning threshold that is in accordance with the encoding method is determined by referring to a table prepared in advance. Here, similarly to FIG. 4, maxDRL is recorded using the same encoding method as the encoding method of moving image data. Note that steps that are the same as those described in FIGS. 3 and 4 are given the same reference numerals as those in FIGS. 3 and 4.

In step S301, the CPU 103 acquires maxDRL corresponding to the moving image data to be played back. Here, maxDRL is acquired from metadata of a moving image data file recorded in the recording medium 106.

In step S401, the CPU 103 determines whether or not the moving image data to be played back is encoded using the video range. For example, the CPU 103 can acquire the encoding method of the moving image data from the metadata of the moving image data file.

If it is determined that the moving image data is encoded using the video range, the CPU 103 executes step S503. Furthermore, if it is not determined that the moving image data is encoded in the video range (if it is determined that the moving image data is encoded using the full range), the CPU 103 executes step S502.

In step S502, the CPU 103 acquires a highlight warning threshold by referring to a table for the full range based on maxDRL acquired in step S301.

In step S503, the CPU 103 acquires a highlight warning threshold by referring to a table for the video range based on maxDRL acquired in step S301.

Figure 7C:
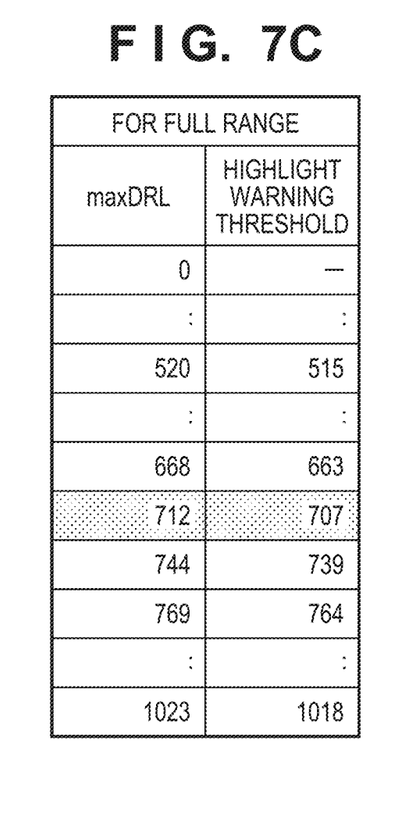
Figure 7D:
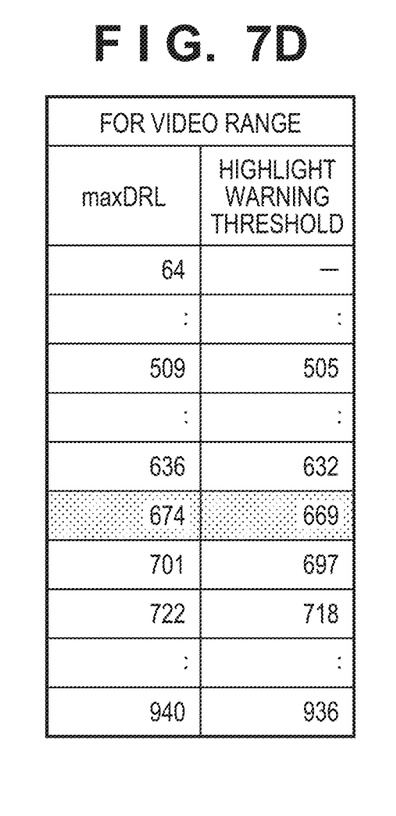

FIGS. 7C and 7D illustrate an example of highlight warning threshold tables. A table is prepared for each encoding method, and is stored in the secondary storage 107, for example. FIG. 7C is a table for the full range, and FIG. 7D is a table for the video range. In each table, a plurality of discrete maxDRL values including the maximum and minimum maxDRL values, and highlight warning thresholds are associated with one another.

In a case in which maxDRL is encoded using the full range and the value thereof is 712, 707 is obtained as the highlight warning threshold in step S502. Similarly, if maxDRL is encoded using the video range and the value thereof is 674, 669 is obtained as the highlight warning threshold in step S503.

Note that, in a case in which the acquired maxDRL value is not present in a table, the CPU 103 acquires highlight warning thresholds corresponding to two values on both sides of the acquired maxDRL value among the maxDRL values registered in the table. Furthermore, the CPU 103 can obtain a highlight warning threshold corresponding to the acquired maxDRL by performing interpolation of the two highlight warning thresholds in accordance with the differences between the acquired maxDRL value and the two values.

In such a manner, conversion for adaptation to a different encoding method becomes unnecessary by preparing, for each encoding method, a table in which maxDRL and highlight warning thresholds are associated with one another. Thus, appropriate highlight warning display in accordance with the encoding method can be realized while simplifying the threshold calculation processing.

Example 4

Figure 6:
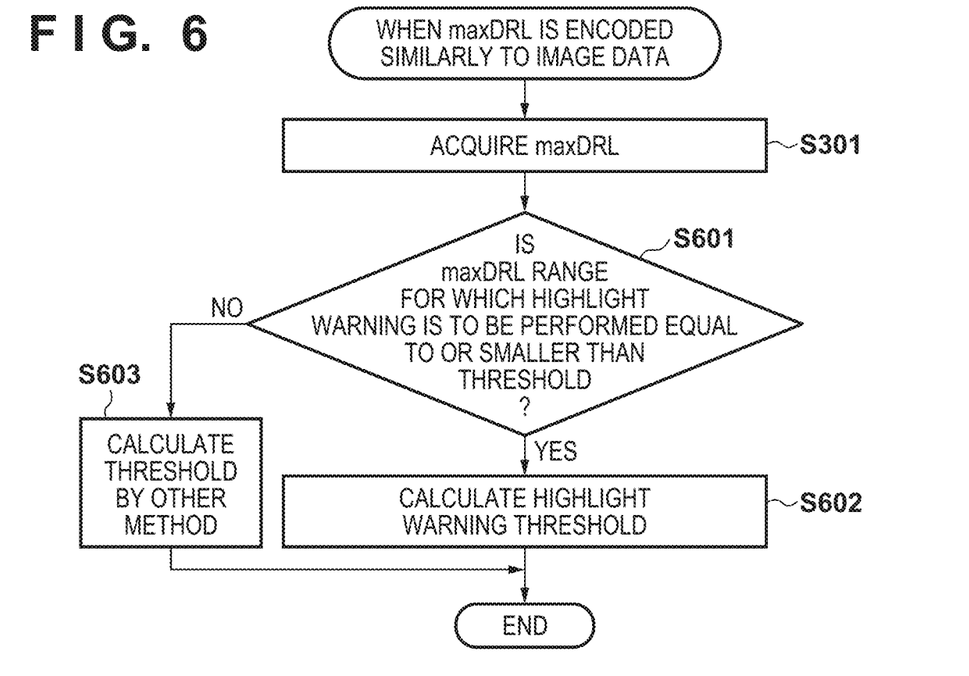
FIG. 6 is a flowchart relating to yet another example of the threshold calculation processing in the first embodiment.

FIG. 6 is a flowchart relating to highlight-warning-threshold calculation processing in which a highlight warning threshold that is in accordance with the encoding method is directly calculated from maxDRL. Here, similarly to FIG. 4, maxDRL is recorded using the same encoding method as the encoding method of moving image data. Note that steps that are the same as those described in FIG. 3 are given the same reference numerals as those in FIG. 3.

In step S301, the CPU 103 acquires maxDRL corresponding to the moving image data to be played back. Here, maxDRL is acquired from metadata of a moving image data file recorded in the recording medium 106.

In step S601, the CPU 103 determines whether or not a maxDRL range for which highlight warning is to be performed is equal to or smaller than a threshold. The CPU 103 executes step S602 if it is determined that the maxDRL range for which highlight warning is to be performed is equal to or smaller than the threshold, and otherwise executes step S603. This determination may be configured as a determination of whether or not the proportion of the numerical range of the encoding method of maxDRL that is occupied by the maxDRL range for which highlight warning is to be performed is equal to or smaller than a threshold.

In step S602, the CPU 103 calculates a highlight warning threshold by applying a predetermined method to maxDRL without taking the encoding method of maxDRL into consideration. This is because, in a case in which the maxDRL range for which highlight warning is to be performed is small (is equal to or smaller than the threshold), the influence of the difference in encoding method on the level of the threshold would be small.

For example, suppose that the value 769 of maxDRL encoded using the full range and the value 722 of maxDRL encoded using the video range correspond to one another, as has been described in relation to FIGS. 7A and 7B. Furthermore, suppose that the maxDRL range for which highlight warning is to be performed is 5.

Here, a case will be considered in which the method for calculating a highlight warning threshold from maxDRL is subtracting 5 from maxDRL. Here, in a case in which maxDRL is encoded using the full range, the threshold calculated by subtracting 5 from maxDRL would be 764. If the threshold 764 is converted into a corresponding threshold in the video range using formula 1, the threshold after conversion would be 718. On the other hand, in a case in which maxDRL is encoded using video range, the threshold calculated by subtracting 5 from maxDRL would be 717, which is approximately the same as the value obtained by performing conversion using formula 1.

The same applies also to a case in which a factor is multiplied instead of subtracting a value. In a case in which the maxDRL range for which highlight warning is to be performed is 5, the factor to be multiplied in a case in which maxDRL is encoded using the full range would be 0.993 (=764/769). The value 717.3 would be obtained by multiplying the value 722 of maxDRL encoded using the video range by the same factor, and the value obtained by rounding the digit of this value after the decimal point would be 717 or 718, which is also approximately the same as the value 718 obtained by converting 764 using formula 1.

Accordingly, the threshold to be used in the determination in step S601 can be determined experimentally, for example, as the maximum maxDRL range for which the difference between the highlight warning threshold obtained by performing conversion using formula 1 and the highlight warning threshold obtained using the method applied in step S602 is ignorable.

On the other hand, in step S603, the CPU 103 calculates a highlight warning threshold using a different method, e.g., one of the methods described in examples 1-3.

Note that the dynamic range of an image can also be ascertained using minDRL besides maxDRL; minDRL is the minimum output luminance value [nits] or a tone value corresponding thereto, which changes in accordance with shooting settings such as the shooting mode and the ISO speed. In this case, the above-described method may be applied to calculate a threshold for performing highlight warning in a predetermined highlight-side range of the dynamic range.

Furthermore, thresholds to be used to perform false color display in which an image is displayed in colors corresponding to exposure states can also be calculated according to the method described earlier. In this case, thresholds can be calculated after applying a tone characteristic opposite to the tone characteristic applied to the image and establishing a linear relationship between tone values and luminance.

As described up to this point, according to the present embodiment, an image processing apparatus and an image processing method that can process luminance data appropriately in accordance with the encoding method applied to image data can be provided.

Second Embodiment

Next, a second embodiment of the present invention will be described. In the present embodiment, luminance histogram display of an image is executed appropriately in accordance with the encoding method. Similarly to the first embodiment, the present embodiment is also executed by the camera 100. Furthermore, in the present embodiment, minDRL is recorded in addition to maxDRL as metadata of an image data file.

A luminance histogram of image data is usually displayed on the same screen as an image represented by the image data; however, the luminance histogram can be displayed in any form. Furthermore, luminance histogram display processing can be applied to still image data or moving image data, and before or after recording. Here, the luminance histogram display processing is applied to one frame of recorded still image data or moving image data. Furthermore, maxDRL and minDRL are encoded using the full range.

Example 1

An example of the histogram display processing will be described with reference to the flowchart illustrated in FIG. 8.

In step S801, the CPU 103 acquires maxDRL (first information) and minDRL (second information) corresponding to target image data. Here, maxDRL and minDRL are acquired from metadata of an image data file recorded in the recording medium 106.

In step S802, the CPU 103 reads the image data and stores the image data in the primary storage 104. Furthermore, the CPU 103 instructs the image processing unit 105 to analyze the luminance distribution of the image data. The image processing unit 105 classifies the pixels into a plurality of bins each having a predetermined width based on the luminance values of the pieces of pixel data.

In step S803, the CPU 103 determines whether or not the target image data is encoded using the video range. For example, the CPU 103 can acquire the encoding method of the image data from the metadata of the image data file.

Here, it is assumed that maxDRL and minDRL are encoded using the full range. Thus, if it is determined that the image data is encoded using the video range in step S803, the CPU 103 executes step S804. Furthermore, if it is determined that the image data is not encoded using the video range (is encoded using the full range), the CPU 103 skips step S804 and executes step S805.

In step S804, the CPU 103 converts maxDRL and minDRL acquired in step S801 into corresponding values in the video range. In a case in which maxDRL and minDRL are 10-bit values, the CPU 103 can execute the conversion using above-described formula 2'. While formula 2' is a conversion formula relating to maxDRL, minDRL can also be converted using the same formula.

In step S805, together with maxDRL and minDRL, the CPU 103 provides the image processing unit 105 with an instruction to generate histogram display image data. In response to the instruction, the image processing unit 105 generates display image data representing the histogram generated in step S802. In doing so, the image processing unit 105 generates display image data for a histogram from which a range in which tone values are greater than maxDRL and a range in which tone values are smaller than minDRL are excluded. Note that bins including minDRL and maxDRL need not be excluded. The range in which tone values are greater than maxDRL and the range in which tone values are smaller than minDRL are called masked regions. The masked regions are regions of luminance that cannot be present in the image data, and can also be called invalid regions. On the other hand, the range from minDRL to maxDRL can be considered as a valid range of luminance. The histogram display image data generated by the image processing unit 105 is displayed by the display unit 108.

The display image data generation processing in step S805 will be described with reference to FIGS. 11A to 11C.

Figure 11A:
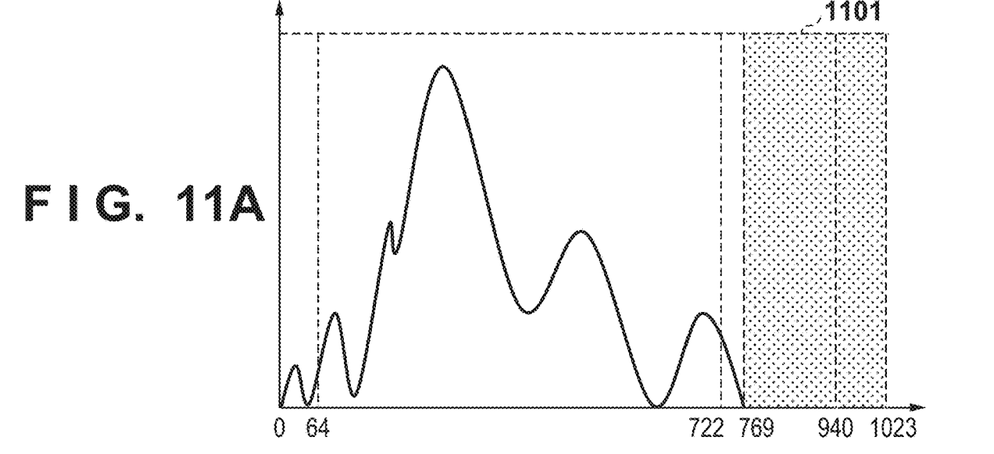
FIGS. 11A to 11C are diagrams for describing histogram display in the second embodiment.

FIG. 11A is a luminance histogram of image data encoded using the full range. If minDRL is 0 and maxDRL is 769, display image data would be generated in which hatching is displayed on a masked region 1101 that is not included in the range of tone values 0 to 769. Thus, the user can easily understand the relationship between the maximum bit number of the image data and the maximum luminance based on maxDRL. As a matter of course, display image data may be generated of a histogram for the range of tone values 0 to 769, from which the masked region 1101 has been excluded.

Figure 11B:
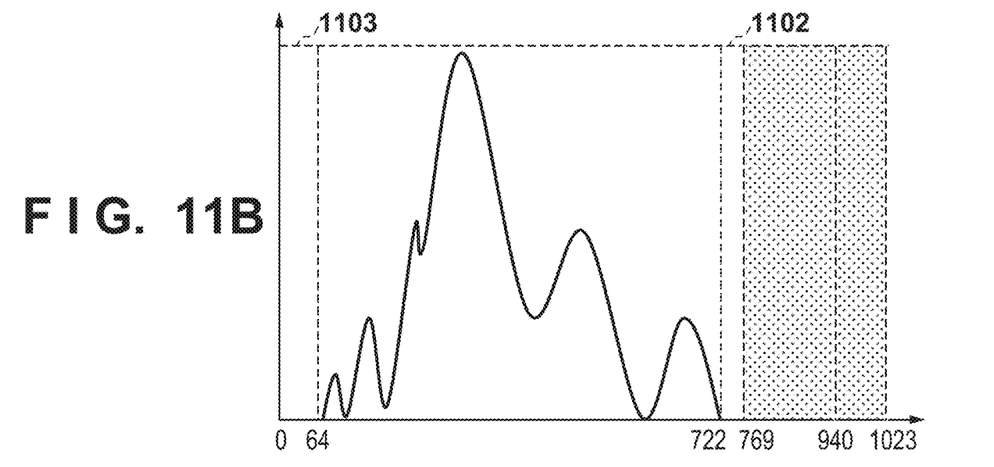

FIG. 11B is a luminance histogram obtained by converting the luminance histogram in FIG. 11A into a corresponding range in the video range. If minDRL of 0 and maxDRL of 769 are applied to the luminance histogram in FIG. 11B, display image data is generated of a histogram in which hatching is not provided to regions 1102 and 1103 that are to be set as masked regions. This may lead to the user misunderstanding that the regions 1102 and 1103 are parts of the dynamic range.

Figure 11C:
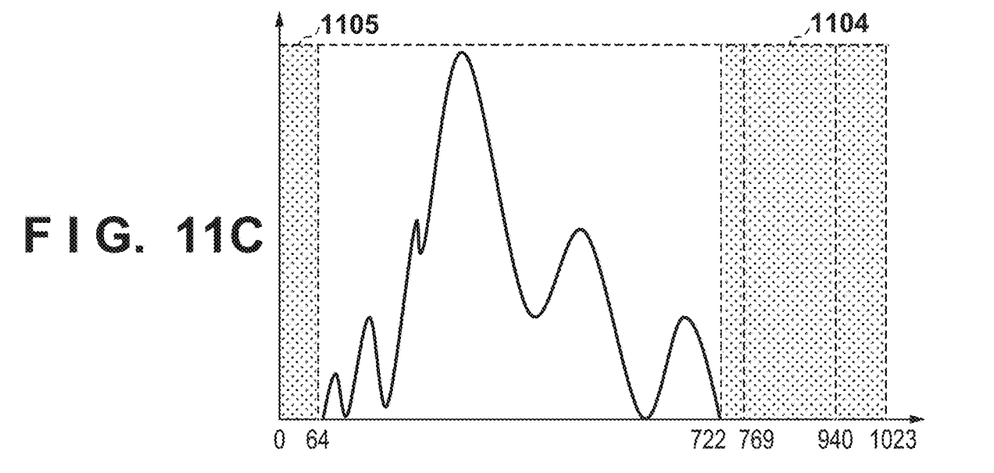

FIG. 11C illustrates a state in which maxDRL and minDRL converted to corresponding values in the video range have been applied to the luminance histogram in FIG. 11B. Because minDRL and maxDRL after conversion would be 64 and 722, respectively, the regions 1102 and 1103 in FIG. 11B are included in masked regions 1104 and 1105. Thus, appropriate histogram display can be realized even if image data is encoded using the video range.

Note that, in a case in which histogram display is to be executed for unrecorded image data such as image data for live-view display, it is sufficient that maxDRL and minDRL that are in accordance with the shooting settings be acquired from the secondary storage 107 and used. The rest of the processing would be the same as that described with reference to FIG. 8.

Furthermore, in a case in which maxDRL and minDRL are encoded using the video range and the image data is encoded using the full range, it is sufficient that maxDRL and minDRL be converted into corresponding values in the full range using formula 2. While formula 2 is a conversion formula relating to maxDRL, minDRL can also be converted using the same formula.

Example 2

Another example of the histogram display processing will be described with reference to the flowchart illustrated in FIG. 9. Also in the present example, maxDRL and minDRL are encoded using the full range. Furthermore, steps that are the same as those described in FIG. 8 are given the same reference numerals as those in FIG. 8.

In step S901, the CPU 103 reads target image data from the recording medium 106 and stores the target image data in the primary storage 104. Furthermore, the CPU 103 determines whether or not the target image data is encoded using the video range. For example, the CPU 103 can acquire the encoding method of the image data from the metadata of the image data file.

Here, it is assumed that maxDRL and minDRL are encoded using the full range. Thus, if it is determined that the image data is encoded using the video range in step S901, the CPU 103 executes step S902. Furthermore, if it is determined that the image data is not encoded using the video range (is encoded using the full range), the CPU 103 skips step S902 and executes step S801.

In step S902, the CPU 103 instructs the image processing unit 105 to convert the luminance values of the image data to corresponding values in the full range. The image processing unit 105 can obtain luminance values (tone values) after conversion by substituting the luminance values (tone values) before conversion for maxDRL_v in formula 2. Note that, in order to reduce processing load, the conversion may be applied after reducing the resolution of the image data to the display resolution.

Figure 8:
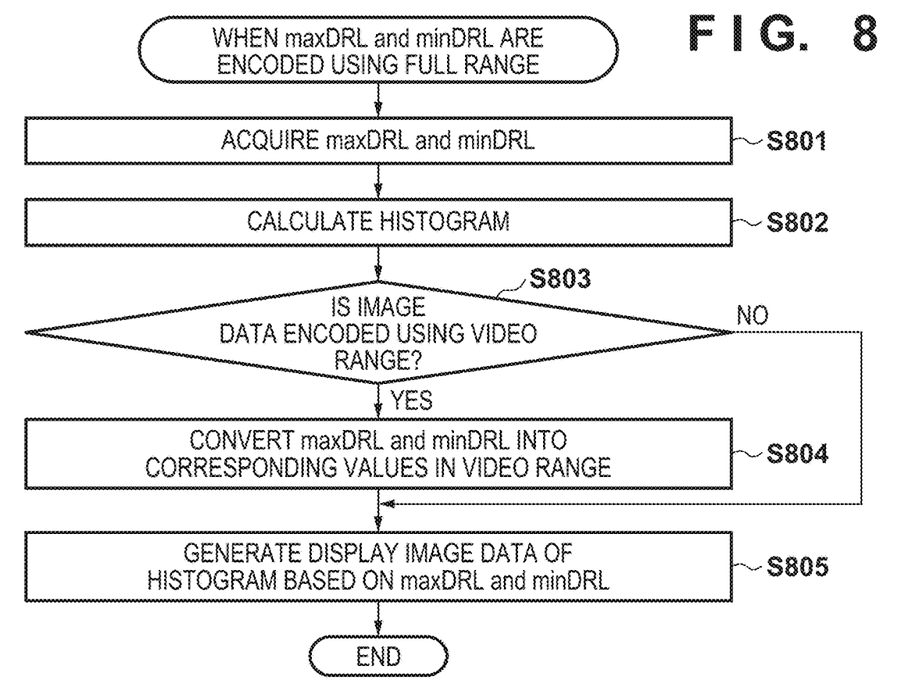
FIG. 8 is a flowchart relating to an example of histogram display processing in a second embodiment.
Figure 9:
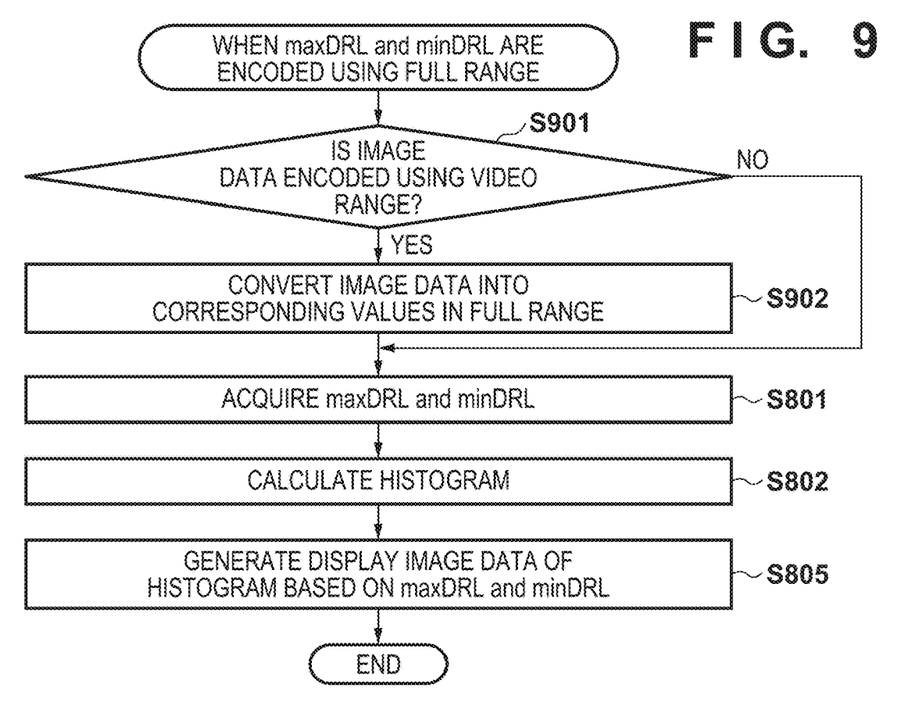
FIG. 9 is a flowchart relating to another example of the histogram display processing in the second embodiment.

Following this, the processing in steps S801, S802, and S805 is as described in relation to FIG. 8; thus, repetitive description is omitted.

Also in the present example, a histogram similar to that in FIG. 11A can be displayed.

Note that, in a case in which maxDRL and minDRL are encoded using the video range, histogram display as in FIG. 11C can be realized by converting the image data to corresponding values in the video range if the image data is encoded using the full range. The image data can be converted using formula 2'.

Example 3

Figure 10:
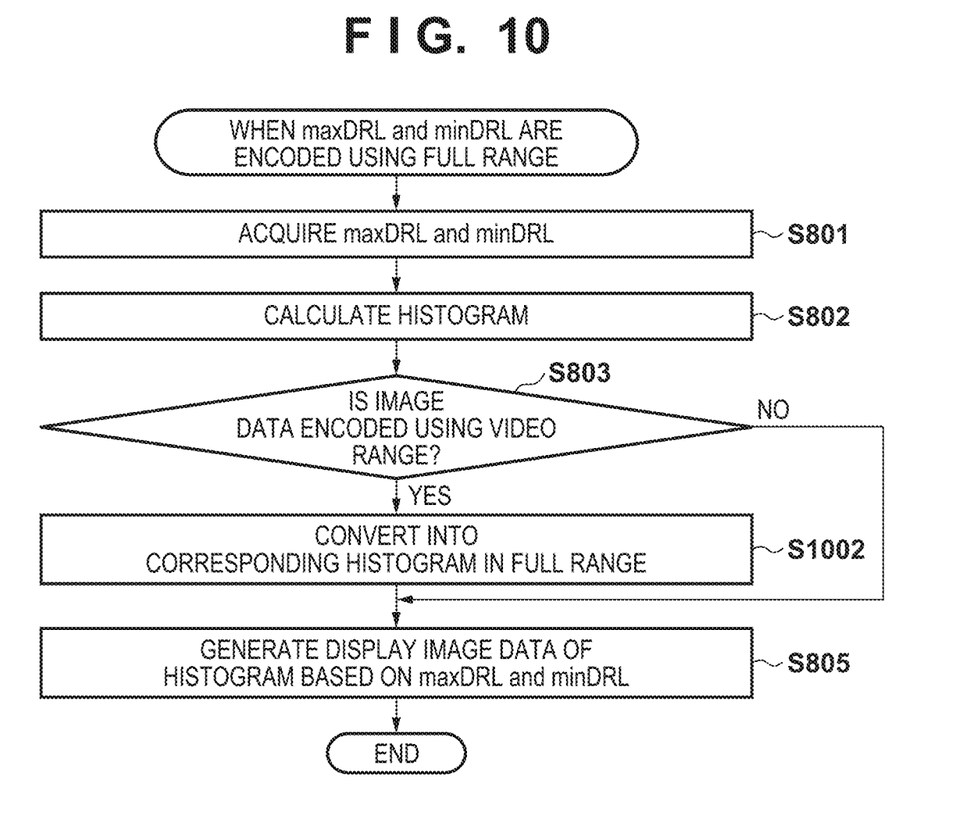
FIG. 10 is a flowchart relating to yet another example of the histogram display processing in the second embodiment.

Yet another example of the histogram display processing will be described with reference to the flowchart illustrated in FIG. 10. Also in the present example, maxDRL and minDRL are encoded using the full range. Furthermore, steps that are the same as those described in FIG. 8 are given the same reference numerals as those in FIG. 8.

Steps S801 to S803 are as described in relation to FIG. 8.

Here, it is assumed that maxDRL and minDRL are encoded using the full range. Thus, if it is determined that the image data is encoded using the video range in step S803, the CPU 103 executes step S1002. Furthermore, if it is determined that the image data is not encoded using the video range (is encoded using the full range), the CPU 103 skips step S1002 and executes step S805.

In step S1002, the CPU 103 instructs the image processing unit 105 to convert the histogram calculated in step S802 into a corresponding histogram in the full range. This is equivalent to converting the histogram illustrated in FIG. 11B into the histogram illustrated in FIG. 11A (masked regions are not considered here).

For example, the image processing unit 105 may convert the luminance values of the pixels into corresponding values in the full range and re-generate a histogram, or may perform conversion by transforming the histogram generated in step S802.

Once the histogram conversion processing by the image processing unit 105 is complete, in step S805, together with maxDRL and minDRL, the CPU 103 provides the image processing unit 105 with an instruction to generate histogram display image data.

Note that, in a case in which maxDRL and minDRL are encoded using the video range, it is sufficient that the histogram be converted into a corresponding histogram in the video range if the image data is encoded using the full range. Thus, a histogram as illustrated in FIG. 11C, in which hatching is provided to the masked regions 1104 and 1105, would be displayed.

Figure 12:
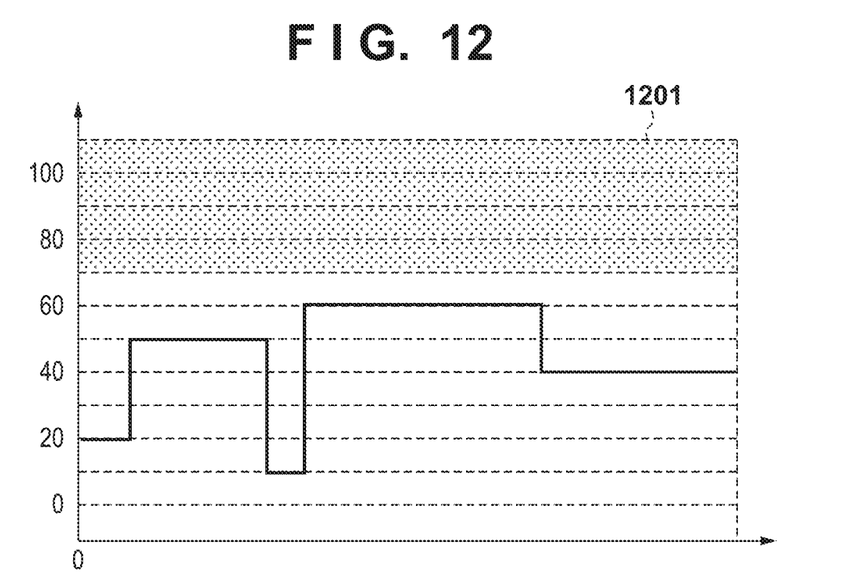
FIG. 12 is a diagram illustrating an example in which the second embodiment is applied to waveform monitor display.

Note that, while the present embodiment has been described taking a luminance histogram as an example, the same processing can be performed for RGB histograms as well. Furthermore, the present embodiment is not limited to being applied to the display of a luminance histogram, and can be applied to other purposes of use. For example, masked regions in luminance waveform monitor display can be determined based on maxDRL and minDRL. In this case, it is sufficient that maxDRL and minDRL be converted into values obtained by setting the maximum luminance in the dynamic range of the camera 100 (image sensor) as 100% and used. FIG. 12 illustrates a display example of a waveform display monitor in a case in which minDRL is 0% and maxDRL is 70%, and a region 1201 is a masked region.

According to the present embodiment as well, an image processing apparatus and an image processing method that can process luminance data appropriately in accordance with the encoding method applied to image data can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-181245, filed on Nov. 11, 2022, which is hereby incorporated by reference herein in its entirety.

What is claimed is:

1. An image processing apparatus comprising:
one or more processors that execute a program stored in a memory and thereby function as:
an acquiring unit configured to acquire image data and first information relating to a maximum luminance value of an output dynamic range of the image data; and
a processing unit configured to apply, to the image data, processing in which a luminance value of the image data and a first value based on the first information are used,
wherein, in a case in which the image data is encoded in a first numerical range and the first information is encoded in a second numerical range that is different from the first numerical range, the processing unit applies the processing to the image data after converting the image data, the first information, or the first value so that the image data and the first value have values if the image data and the first value would have been encoded in a same numerical range.

2. The image processing apparatus according to claim 1, wherein, in a case in which the image data is encoded in the first numerical range and the first information is encoded in the second numerical range, the processing unit converts the first value so that the image data and the first value have values if the image data and the first value would have been encoded in a same numerical range.

3. The image processing apparatus according to claim 1, wherein, in a case in which processing for generating the first value from the first information is based on an assumption that the first information is encoded in the first numerical range, and the image data is encoded in the second numerical range, the processing unit:

converts the first information so as to have a value if the first information would have been encoded in the first numerical range;
generates the first value based on the converted value;
converts the generated first value so as to have a value if it would have been encoded in the second numerical range; and
applies the processing to the image data.

4. The image processing apparatus according to claim 1, wherein, in a case in which the image data and the first information are encoded in a same numerical range, the processing unit generates the first value from the first information by referring, based on the same numerical range, to a table prepared in advance for each of the first numerical range and the second numerical range.

5. The image processing apparatus according to claim 1, wherein the conversion is not performed in a case in which a proportion of a range in which the first value is encoded occupies in the second numerical range is equal to or smaller than a threshold.

6. The image processing apparatus according to claim 1, wherein the first numerical range is part of the second numerical range.

7. The image processing apparatus according to claim 1, wherein the processing is highlight warning processing for presenting a region in the image data whose luminance is higher than or equal to the first value.

8. The image processing apparatus according to claim 1, wherein the acquiring unit is further configured to acquire second information relating to a minimum luminance value of the output dynamic range of the image data,
the processing unit is further configured to apply, to the image data, processing in which a luminance value of the image data, the first value, and a second value based on the second information are used, and
wherein, in a case in which the image data is encoded in the first numerical range and the first and second information are encoded in the second numerical range, the processing unit applies the processing to the image data after converting the image data, the first and second information, or the first and second values so that the image data and the first and second values have values corresponding to if the image data and the first and second values would have been encoded in a same numerical range.

9. The image processing apparatus according to claim 8, wherein, in a case in which the image data is encoded in the first numerical range and the first and second information are encoded in the second numerical range, the processing unit converts the first and second values so that the image data and the first and second values have values if the image data and the first and second values would have been encoded in the same numerical range.

10. The image processing apparatus according to claim 8, wherein, in a case in which the image data is encoded in the first numerical range and the first and second information are encoded in the second numerical range, the processing unit converts values of the image data so that the image data and the first and second values have values if the image data and the first and second values would have been encoded in the same numerical range.

11. The image processing apparatus according to claim 8, wherein the processing is processing in which a luminance range from the second value to the first value is considered as a valid range.

12. The image processing apparatus according to claim 8, wherein the processing is for displaying a luminance histogram or a luminance waveform monitor.

13. The image processing apparatus according to claim 8, wherein the processing is for displaying a luminance histogram, and
the processing unit displays a luminance histogram from which a range equal to or less than the second value and a range more than or equal to the first value are excluded.

14. The image processing apparatus according to claim 8, wherein the processing is for displaying a luminance histogram, and
the processing unit:
converts a luminance histogram generated based on the image data into a luminance histogram if the image data would have been encoded in the second numerical range; and
applies, to the luminance histogram after the conversion, processing in which the first and second values are used, and then displays the luminance histogram.

15. The image processing apparatus according to claim 8, wherein the processing is for displaying a waveform monitor, and
the processing unit displays a waveform monitor in which a range other than a range from the second value to the first value is a masked region.

16. An image capture apparatus comprising:
an image sensor; and
an image processing apparatus that uses image data obtained using the image sensor,
wherein the image processing apparatus comprising:
one or more processors that execute a program stored in a memory and thereby function as:
an acquiring unit configured to acquire image data and first information relating to a maximum luminance value of an output dynamic range of the image data; and
a processing unit configured to apply, to the image data, processing in which a luminance value of the image data and a first value based on the first information are used,
wherein, in a case in which the image data is encoded in a first numerical range and the first information is encoded in a second numerical range that is different from the first numerical range, the processing unit applies the processing to the image data after converting the image data, the first information, or the first value so that the image data and the first value have values if the image data and the first value would have been encoded in a same numerical range.

17. An image processing method to be executed by an image processing apparatus, the image processing method comprising:
acquiring image data and first information relating to a maximum luminance value of an output dynamic range of the image data; and
applying, to the image data, processing in which a luminance value of the image data and a first value based on the first information are used,
wherein, in a case in which the image data is encoded in a first numerical range and the first information is encoded in a second numerical range that is different from the first numerical range, the applying of the processing includes:
converting the image data, the first information, or the first value so that the image data and the first value have values if the image data and the first value would have been encoded in a same numerical range; and after the converting, applying the processing to the image data.

18. A non-transitory computer-readable medium that stores therein a program including instructions that can be executed by a computer, the instructions, when executed by the computer, causing the computer to execute an image processing method comprising:

acquiring image data and first information relating to a maximum luminance value of an output dynamic range of the image data; and applying, to the image data, processing in which a luminance value of the image data and a first value based on the first information are used, wherein, in a case in which the image data is encoded in a first numerical range and the first information is encoded in a second numerical range that is different from the first numerical range, the applying of the processing includes:

converting the image data, the first information, or the first value so that the image data and the first value have values if the image data and the first value would have been encoded in a same numerical range; and after the converting, applying the processing to the image data.

* * * * *